United States Patent
Raghoebardajal et al.

(10) Patent No.: US 8,311,384 B2
(45) Date of Patent: Nov. 13, 2012

(54) IMAGE PROCESSING METHOD, APPARATUS AND SYSTEM

(75) Inventors: Sharwin Winesh Raghoebardajal, London (GB); Mark Lintott, London (GB)

(73) Assignee: Sony Computer Entertainment Europe Limited (GB)

( * ) Notice: Subject to any disclaimer, the term of this patent is extended or adjusted under 35 U.S.C. 154(b) by 155 days.

(21) Appl. No.: 12/876,525

(22) Filed: Sep. 7, 2010

(65) Prior Publication Data

US 2011/0064375 A1 Mar. 17, 2011

(30) Foreign Application Priority Data

Sep. 7, 2009 (GB) .................................. 0915589.6

(51) Int. Cl.
*H04N 5/77* (2006.01)
(52) U.S. Cl. ........ 386/224; 386/227; 386/228; 386/248; 345/633; 345/632; 345/9
(58) Field of Classification Search .................. 386/224, 386/227, 228, 248; 345/633, 632, 9
See application file for complete search history.

(56) References Cited

U.S. PATENT DOCUMENTS

| 7,190,331 | B2* | 3/2007 | Genc et al. ........................ 345/9 |
| 7,542,051 | B2* | 6/2009 | Matsui et al. .................. 345/633 |
| 7,728,852 | B2* | 6/2010 | Suzuki et al. .................. 345/632 |
| 2005/0215879 | A1 | 9/2005 | Chuanggui |
| 2007/0146391 | A1 | 6/2007 | Pentenrieder et al. |

FOREIGN PATENT DOCUMENTS

WO 2004013810 A1 2/2004

OTHER PUBLICATIONS

Search Report from GB Application No. 0915589.6 dated Jan. 5, 2010.
Billinghurst et al., "Advanced interaction techniques for augmented reality applications", Jul. 19, 2009 9 Virtual and Mixedd Realitv 9 Springer Berlin Heidelberg, Berlin, Heidelberg9 pp. 13-22, XP019123126, ISBN: 978-3-642-02770-3.
Extended European Search Report for Application No. EP10175025 dated Jul. 3, 2012.

* cited by examiner

*Primary Examiner* — Helen Shibru
(74) *Attorney, Agent, or Firm* — Lerner, David, Littenberg, Krumholz & Mentlik, LLP

(57) ABSTRACT

An image processing method receives a sequence of image frames and generates a computer generated object. The method combines the object with the sequence of frames to generate a sequence of augmented reality images. The method divides each received image frame into a respective array of image motion cells, detects inter-image motion in successive image frames for each motion cell, and generates a motion object comprising one or more image motion cells. The image motion cells in the motion object correspond to a set of image motion cells detected as comprising inter-image motion over a threshold number of image frames. The method detects relative distance between the object and the motion object within the augmented reality images, and generates a point of interest within a current image frame so the object may appear to interact with an image region corresponding to an image motion cell at the point of interest.

19 Claims, 6 Drawing Sheets

IMAGE PROCESSING METHOD, APPARATUS AND SYSTEM

CROSS REFERENCE TO RELATED APPLICATIONS

The present application claims the benefit of and priority to GB Patent Application No. 0915589.6, filed Sep. 7, 2009, the entire disclosure of which is incorporated by reference herein.

BACKGROUND OF THE INVENTION

1. Field of the Invention

The present invention relates to an image processing method, apparatus and system.

2. Description of Related Art

Recently, with the advent of ever more powerful computers, real time tracking of objects using a video camera has become more achievable. Furthermore, such systems may be used to combine real images with virtual images so as to generate augmented reality images and produce a content-rich media experience for a user.

Augmented reality is increasingly being used in video game systems. Typically, a three-dimensional virtual world may be generated by an entertainment device and combined with real images captured by the camera, which are typically two-dimensional, so as to generate the augmented reality images. For example, a user may interact with a computer generated object by causing inter-image motion (for example by moving their hand) to occur in an image region of the augmented reality images near the computer generated object. The entertainment device can then detect the inter-image motion and cause the computer generated object to react accordingly.

However, if there are many image regions of the augmented reality images in which inter-image motion occurs, for example if several users are all waving their hands within a field of view of the camera, it may be difficult for the entertainment device to determine with which image region it should cause the computer generated object to interact. This can impair a gaming experience for a user because the user may not be able to cause the computer generated object to interact at a position intended by the user.

BRIEF SUMMARY OF THE INVENTION

The present invention seeks to alleviate or mitigate the above problems.

In a first aspect, there is provided an image processing method comprising: receiving a sequence of image frames from a video camera; generating a computer generated object, and combining the computer generated object with the sequence of image frames so as to generate a sequence of augmented reality images; dividing each received image frame into a respective array of image motion cells; detecting inter-image motion in successive image frames for each motion cell; generating a motion object comprising one or more image motion cells, the image motion cells in the motion object corresponding to a set of image motion cells detected as comprising inter-image motion over a threshold number of image frames; detecting a relative distance between the computer generated object and the motion object within the augmented reality images; and generating a point of interest within a current image frame in dependence upon the detected distance between the computer generated object and the motion object so that the computer generated object can be caused to appear to interact with an image region corresponding to an image motion cell at the point of interest.

In a second aspect, there is provided an image processing device comprising: receiving means operable to receive a sequence of image frames from a video camera; image generating means operable to generate a computer generated object, and to combine the computer generated object with the sequence of image frames so as to generate a sequence of augmented reality images; image dividing means operable to divide each received image frame into a respective array of image motion cells; motion detecting means operable to detect inter-image motion in successive image frames for each motion cell; image processing means operable to generate a motion object comprising one or more image motion cells, the image motion cells in the motion object corresponding to a set of image motion cells detected as comprising inter-image motion over a threshold number of image frames; distance detecting means operable to detect a relative distance between the computer generated object and the motion object within the augmented reality images, in which the image processing means is operable to generate a point of interest within a current image frame in dependence upon the detected distance between the computer generated object and the motion object so that the computer generated object can be caused to appear to interact with an image region corresponding to an image motion cell at the point of interest.

By generating a motion object from image motion cells, a point of interest can be generated within the current image frame in dependence upon a detected distance between the computer generated (CG) object and the motion object. For example, a virtual object such as a virtual pet can then be caused to interact with an image region corresponding to an image motion cell at the point of interest. This advantageously allows the point of interest to be generated such that it is likely to correspond to an image position at which the user wishes to interact with the virtual object. This can provide a more realistic augmented reality experience for a user. Additionally, by detecting motion in respect of image motion cells, processing resources needed to generate a point of interest can be reduced because not all the pixels of the received images need to be analysed to generate a point of interest.

Embodiments of the invention also provide an image processing system comprising an image processing device as defined above and a camera operable to capture a sequence of image frames, and to transmit the sequence of image frames to the image processing apparatus.

Various other aspects and features of the invention are defined in the appended claims.

Embodiments of the present invention will now be described by way of example with reference to the accompanying drawings, in which:

DETAILED DESCRIPTION

An image processing method, apparatus and system are disclosed. In the following description, a number of specific details are presented in order to provide a thorough understanding of embodiments of the present invention. However, it will be apparent to a person skilled in the art that these specific details need not be employed to practise the present invention. Conversely, specific details known to the person skilled in the art are omitted for the purposes of clarity in presenting the embodiments.

Figure 1:
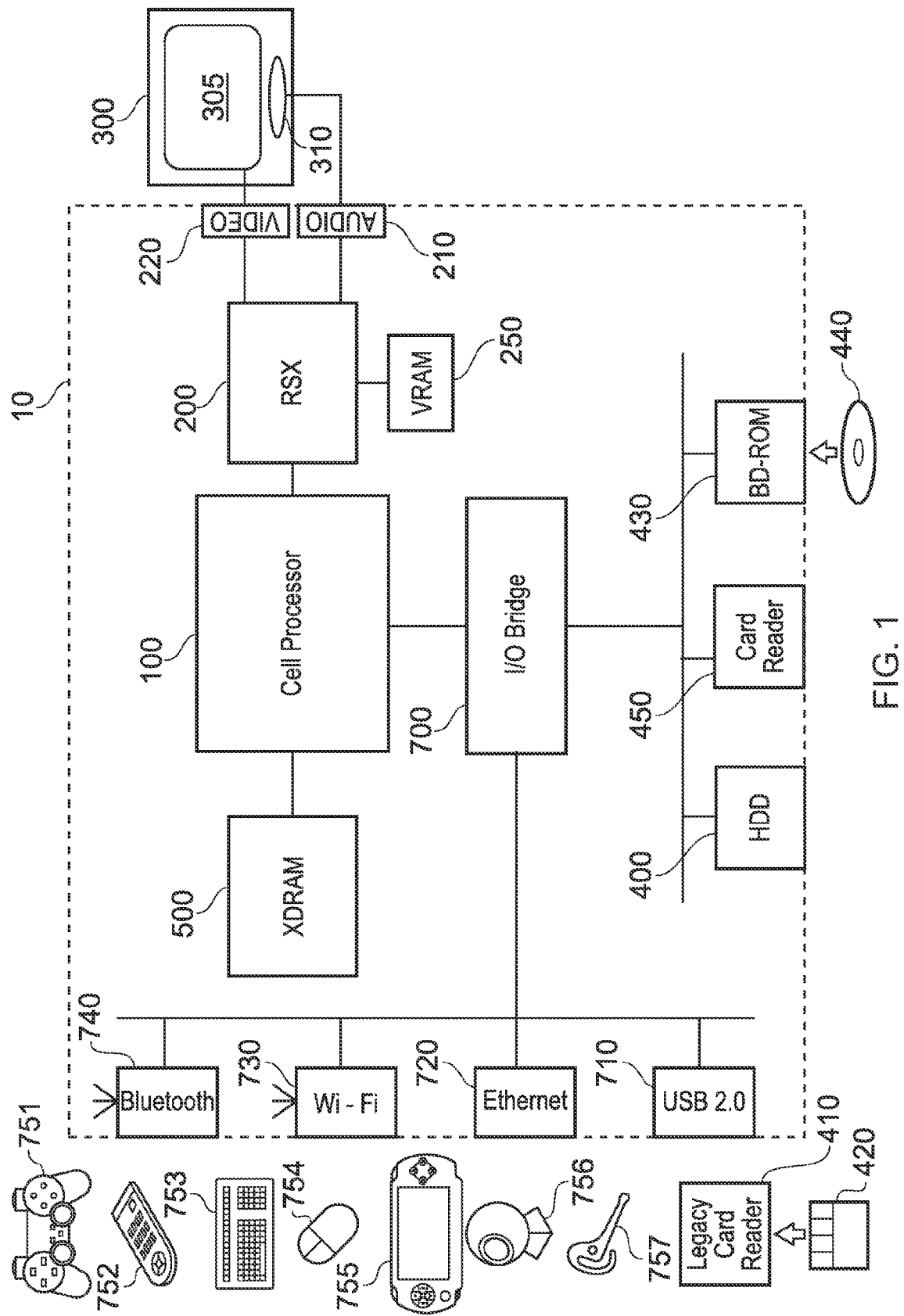
FIG. 1 is a schematic diagram of an entertainment device.

FIG. 1 schematically illustrates the overall system architecture of the Sony® Playstation 3® entertainment device. A system unit 10 is provided, with various peripheral devices connectable to the system unit.

The system unit 10 comprises: a Cell processor 100; a Rambus® dynamic random access memory (XDRAM) unit 500; a Reality Synthesiser graphics unit 200 with a dedicated video random access memory (VRAM) unit 250; and an I/O bridge 700.

The system unit 10 also comprises a Blu Ray® Disk BD-ROM® optical disk reader 430 for reading from a disk 440 and a removable slot-in hard disk drive (HDD) 400, accessible through the I/O bridge 700. Optionally the system unit also comprises a memory card reader 450 for reading compact flash memory cards, Memory Stick® memory cards and the like, which is similarly accessible through the I/O bridge 700.

The I/O bridge 700 also connects to four Universal Serial Bus (USB) 2.0 ports 710; a gigabit Ethernet port 720; an IEEE 802.11b/g wireless network (Wi-Fi) port 730; and a Bluetooth® wireless link port 740 capable of supporting up to seven Bluetooth connections.

In operation the I/O bridge 700 handles all wireless, USB and Ethernet data, including data from one or more game controllers 751. For example when a user is playing a game, the I/O bridge 700 receives data from the game controller 751 via a Bluetooth link and directs it to the Cell processor 100, which updates the current state of the game accordingly.

The wireless, USB and Ethernet ports also provide connectivity for other peripheral devices in addition to game controllers 751, such as: a remote control 752; a keyboard 753; a mouse 754; a portable entertainment device 755 such as a Sony Playstation Portable® entertainment device; a video camera such as an EyeToy® video camera 756; and a microphone headset 757. Such peripheral devices may therefore in principle be connected to the system unit 10 wirelessly; for example the portable entertainment device 755 may communicate via a Wi-Fi ad-hoc connection, whilst the microphone headset 757 may communicate via a Bluetooth link.

The provision of these interfaces means that the Playstation 3 device is also potentially compatible with other peripheral devices such as digital video recorders (DVRs), set-top boxes, digital cameras, portable media players, Voice over IP telephones, mobile telephones, printers and scanners.

In addition, a legacy memory card reader 410 may be connected to the system unit via a USB port 710, enabling the reading of memory cards 420 of the kind used by the Playstation® or Playstation 2® devices.

In the present embodiment, the game controller 751 is operable to communicate wirelessly with the system unit 10 via the Bluetooth link. However, the game controller 751 can instead be connected to a USB port, thereby also providing power by which to charge the battery of the game controller 751. In addition to one or more analogue joysticks and conventional control buttons, the game controller is sensitive to motion in 6 degrees of freedom, corresponding to translation and rotation in each axis. Consequently gestures and movements by the user of the game controller may be translated as inputs to a game in addition to or instead of conventional button or joystick commands. Optionally, other wirelessly enabled peripheral devices such as the Playstation Portable device may be used as a controller. In the case of the Playstation Portable device, additional game or control information (for example, control instructions or number of lives) may be provided on the screen of the device. Other alternative or supplementary control devices may also be used, such as a dance mat (not shown), a light gun (not shown), a steering wheel and pedals (not shown) or bespoke controllers, such as a single or several large buttons for a rapid-response quiz game (also not shown).

The remote control 752 is also operable to communicate wirelessly with the system unit 10 via a Bluetooth link. The remote control 752 comprises controls suitable for the operation of the Blu Ray Disk BD-ROM reader 430 and for the navigation of disk content.

The Blu Ray Disk BD-ROM reader 430 is operable to read CD-ROMs compatible with the Playstation and PlayStation 2 devices, in addition to conventional pre-recorded and recordable CDs, and so-called Super Audio CDs. The reader 430 is also operable to read DVD-ROMs compatible with the Playstation 2 and PlayStation 3 devices, in addition to conventional pre-recorded and recordable DVDs. The reader 430 is further operable to read BD-ROMs compatible with the Playstation 3 device, as well as conventional pre-recorded and recordable Blu-Ray Disks.

The system unit 10 is operable to supply audio and video, either generated or decoded by the Playstation 3 device via the Reality Synthesiser graphics unit 200, through audio and video connectors to a display and sound output device 300 such as a monitor or television set having a display 305 and one or more loudspeakers 310. The audio connectors 210 may include conventional analogue and digital outputs whilst the video connectors 220 may variously include component video, S-video, composite video and one or more High Definition Multimedia Interface (HDMI) outputs. Consequently, video output may be in formats such as PAL or NTSC, or in 720p, 1080i or 1080p high definition.

Audio processing (generation, decoding and so on) is performed by the Cell processor 100. The Playstation 3 device's operating system supports Dolby® 5.1 surround sound, Dolby® Theatre Surround (DTS), and the decoding of 7.1 surround sound from Blu-Ray® disks.

In the present embodiment, the video camera 756 comprises a single charge coupled device (CCD), an LED indicator, and hardware-based real-time data compression and encoding apparatus so that compressed video data may be transmitted in an appropriate format such as an intra-image based MPEG (motion picture expert group) standard for decoding by the system unit 10. The camera LED indicator is arranged to illuminate in response to appropriate control data from the system unit 10, for example to signify adverse lighting conditions. Embodiments of the video camera 756 may variously connect to the system unit 10 via a USB, Bluetooth or Wi-Fi communication port. Embodiments of the video camera may include one or more associated microphones and also be capable of transmitting audio data. In embodiments of the video camera, the CCD may have a resolution suitable for high-definition video capture. In use, images captured by the video camera may for example be incorporated within a game or interpreted as game control inputs.

In general, in order for successful data communication to occur with a peripheral device such as a video camera or remote control via one of the communication ports of the system unit 10, an appropriate piece of software such as a device driver should be provided. Device driver technology is well-known and will not be described in detail here, except to say to that the skilled man will be aware that a device driver or similar software interface may be required in the present embodiment described.

Figure 2:
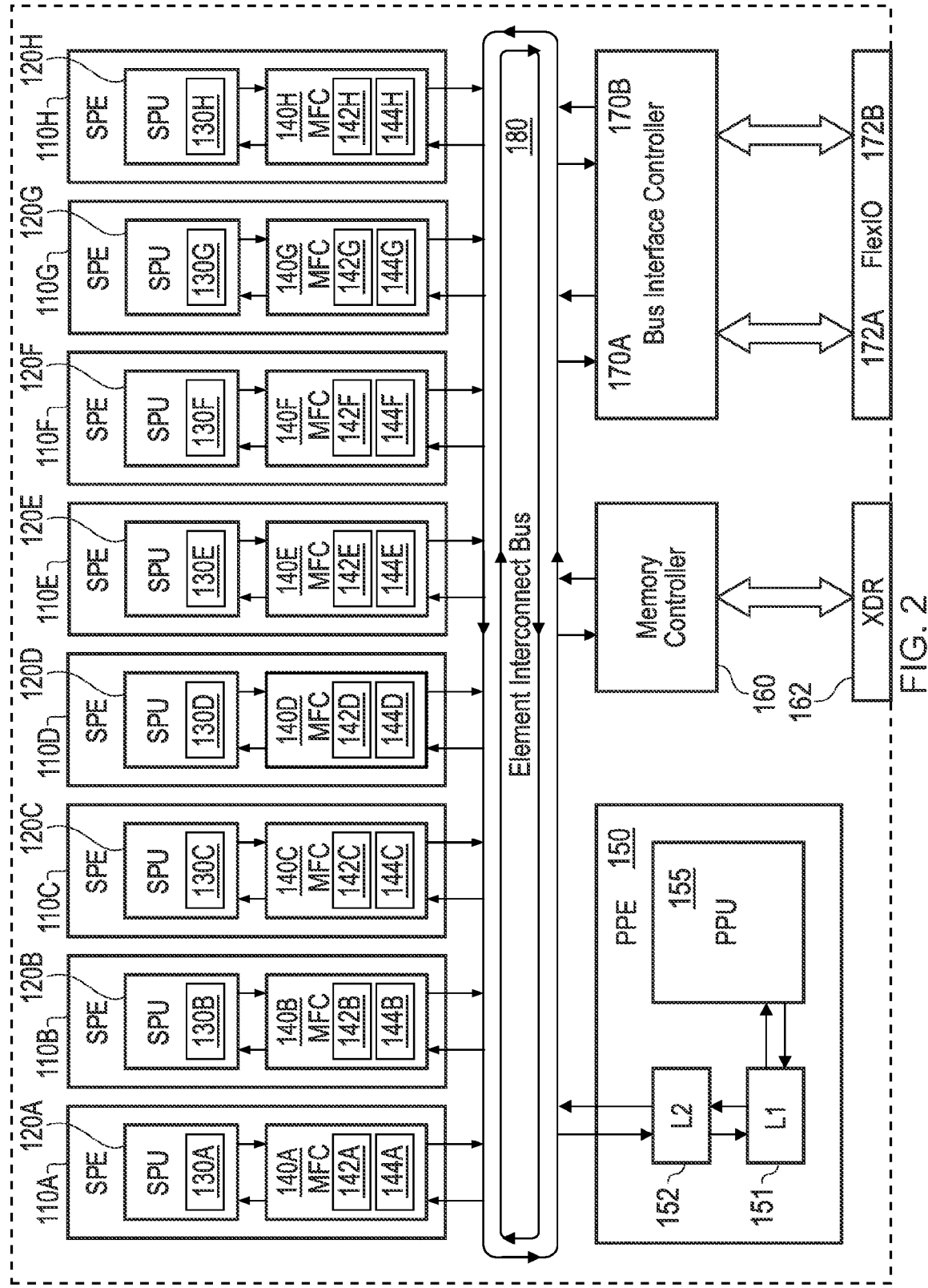
FIG. 2 is a schematic diagram of a cell processor.

Referring now to FIG. 2, the Cell processor 100 has an architecture comprising four basic components: external input and output structures comprising a memory controller 160 and a dual bus interface controller 170A,B; a main processor referred to as the Power Processing Element 150; eight co-processors referred to as Synergistic Processing Elements (SPEs) 110A-H; and a circular data bus connecting the above components referred to as the Element Interconnect Bus 180. The total floating point performance of the Cell processor is 218 GFLOPS, compared with the 6.2 GFLOPs of the Playstation 2 device's Emotion Engine.

The Power Processing Element (PPE) 150 is based upon a two-way simultaneous multithreading Power 970 compliant PowerPC core (PPU) 155 running with an internal clock of 3.2 GHz. It comprises a 512 kB level 2 (L2) cache and a 32 kB level 1 (L1) cache. The PPE 150 is capable of eight single position operations per clock cycle, translating to 25.6 GFLOPs at 3.2 GHz. The primary role of the PPE 150 is to act as a controller for the Synergistic Processing Elements 110A-H, which handle most of the computational workload. In operation the PPE 150 maintains a job queue, scheduling jobs for the Synergistic Processing Elements 110A-H and monitoring their progress. Consequently each Synergistic Processing Element 110A-H runs a kernel whose role is to fetch a job, execute it and synchronise with the PPE 150.

Each Synergistic Processing Element (SPE) 110A-H comprises a respective Synergistic Processing Unit (SPU) 120A-H, and a respective Memory Flow Controller (MFC) 140A-H comprising in turn a respective Dynamic Memory Access Controller (DMAC) 142A-H, a respective Memory Management Unit (MMU) 144A-H and a bus interface (not shown). Each SPU 120A-H is a RISC processor clocked at 3.2 GHz and comprising 256 kB local RAM 130A-H, expandable in principle to 4 GB. Each SPE gives a theoretical 25.6 GFLOPS of single precision performance. An SPU can operate on 4 single precision floating point members, 4 32-bit numbers, 8 16-bit integers, or 16 8-bit integers in a single clock cycle. In the same clock cycle it can also perform a memory operation. The SPU 120A-H does not directly access the system memory XDRAM 500; the 64-bit addresses formed by the SPU 120A-H are passed to the MFC 140A-H which instructs its DMA controller 142A-H to access memory via the Element Interconnect Bus 180 and the memory controller 160.

The Element Interconnect Bus (EIB) 180 is a logically circular communication bus internal to the Cell processor 100 which connects the above processor elements, namely the PPE 150, the memory controller 160, the dual bus interface 170A,B and the 8 SPEs 110A-H, to totaling 12 participants. Participants can simultaneously read and write to the bus at a rate of 8 bytes per clock cycle. As noted previously, each SPE 110A-H comprises a DMAC 142A-H for scheduling longer read or write sequences. The EIB comprises four channels, two each in clockwise and anti-clockwise directions. Consequently for twelve participants, the longest step-wise dataflow between any two participants is six steps in the appropriate direction. The theoretical peak instantaneous EIB bandwidth for 12 slots is therefore 96 B per clock, in the event of full utilisation through arbitration between participants. This equates to a theoretical peak bandwidth of 307.2 GB/s (gigabytes per second) at a clock rate of 3.2 GHz.

The memory controller 160 comprises an XDRAM interface 162, developed by Rambus Incorporated. The memory controller interfaces with the Rambus XDRAM 500 with a theoretical peak bandwidth of 25.6 GB/s.

The dual bus interface 170A,B comprises a Rambus FlexIO® system interface 172A,B. The interface is organised into 12 channels each being 8 bits wide, with five paths being inbound and seven outbound. This provides a theoretical peak bandwidth of 62.4 GB/s (36.4 GB/s outbound, 26 GB/s inbound) between the Cell processor and the I/O Bridge 700 via controller 170A and the Reality Simulator graphics unit 200 via controller 170B.

Data sent by the Cell processor 100 to the Reality Simulator graphics unit 200 will typically comprise display lists, being a sequence of commands to draw vertices, apply textures to polygons, specify lighting conditions, and so on.

Figure 3:
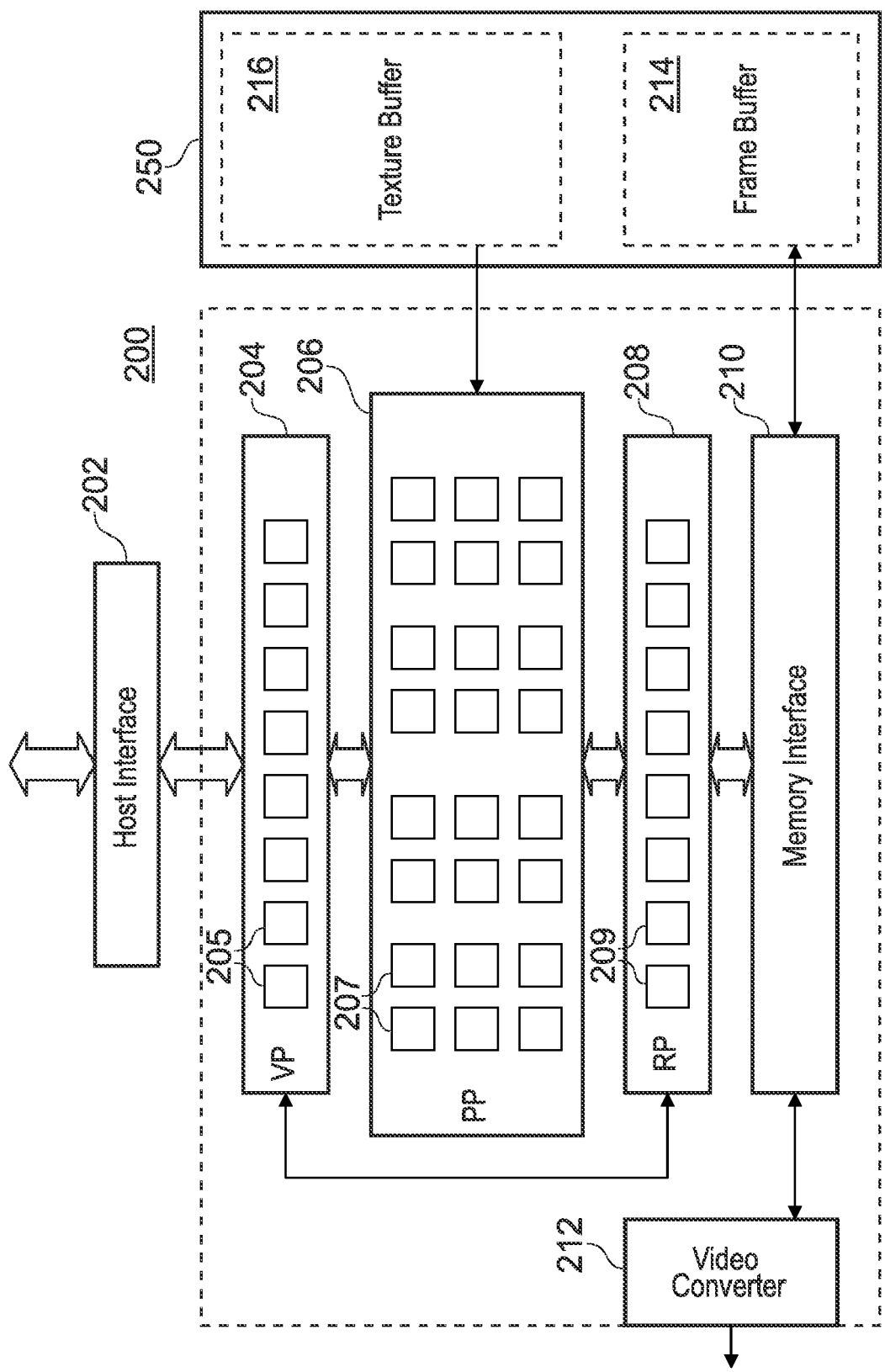
FIG. 3 is a schematic diagram of a video graphics processor.

Referring now to FIG. 3, the Reality Simulator graphics (RSX) unit 200 is a video accelerator based upon the NVidia® G70/71 architecture that processes and renders lists of commands produced by the Cell processor 100. The RSX unit 200 comprises a host interface 202 operable to communicate with the bus interface controller 170B of the Cell processor 100; a vertex pipeline 204 (VP) comprising eight vertex shaders 205; a pixel pipeline 206 (PP) comprising 24 pixel shaders 207; a render pipeline 208 (RP) comprising eight render output units (ROPs) 209; a memory interface 210; and a video converter 212 for generating a video output. The RSX 200 is complemented by 256 MB double data rate (DDR) video RAM (VRAM) 250, clocked at 600 MHz and operable to interface with the RSX 200 at a theoretical peak bandwidth of 25.6 GB/s. In operation, the VRAM 250 maintains a frame buffer 214 and a texture buffer 216. The texture buffer 216 provides textures to the pixel shaders 207, whilst the frame buffer 214 stores results of the processing pipelines. The RSX can also access the main memory 500 via the EIB 180, for example to load textures into the VRAM 250.

The vertex pipeline 204 primarily processes deformations and transformations of vertices defining polygons within the image to be rendered.

The pixel pipeline 206 primarily processes the application of colour, textures and lighting to these polygons, including any pixel transparency, generating red, green, blue and alpha (transparency) values for each processed pixel. Texture mapping may simply apply a graphic image to a surface, or may include bump-mapping (in which the notional direction of a surface is perturbed in accordance with texture values to create highlights and shade in the lighting model) or displacement mapping (in which the applied texture additionally perturbs vertex positions to generate a deformed surface consistent with the texture).

The render pipeline 208 performs depth comparisons between pixels to determine which should be rendered in the final image. Optionally, if the intervening pixel process will not affect depth values (for example in the absence of transparency or displacement mapping) then the render pipeline and vertex pipeline 204 can communicate depth information between them, thereby enabling the removal of occluded elements prior to pixel processing, and so improving overall rendering efficiency. In addition, the render pipeline 208 also applies subsequent effects such as full-screen anti-aliasing over the resulting image.

Both the vertex shaders 205 and pixel shaders 207 are based on the shader model 3.0 standard. Up to 136 shader operations can be performed per clock cycle, with the combined pipeline therefore capable of 74.8 billion shader operations per second, outputting up to 840 million vertices and 10 billion pixels per second. The total floating point performance of the RSX 200 is 1.8 TFLOPS.

Typically, the RSX 200 operates in close collaboration with the Cell processor 100; for example, when displaying an explosion, or weather effects such as rain or snow, a large number of particles must be tracked, updated and rendered within the scene. In this case, the PPU 155 of the Cell processor may schedule one or more SPEs 110A-H to compute the trajectories of respective batches of particles. Meanwhile, the RSX 200 accesses any texture data (e.g. snowflakes) not currently held in the video RAM 250 from the main system memory 500 via the element interconnect bus 180, the memory controller 160 and a bus interface controller 170B. The or each SPE 110A-H outputs its computed particle properties (typically coordinates and normals, indicating position and attitude) directly to the video RAM 250; the DMA controller 142A-H of the or each SPE 110A-H addresses the video RAM 250 via the bus interface controller 170B. Thus in effect the assigned SPEs become part of the video processing pipeline for the duration of the task.

In general, the PPU 155 can assign tasks in this fashion to six of the eight SPEs available; one SPE is reserved for the operating system, whilst one SPE is effectively disabled. The disabling of one SPE provides a greater level of tolerance during fabrication of to the Cell processor, as it allows for one SPE to fail the fabrication process. Alternatively if all eight SPEs are functional, then the eighth SPE provides scope for redundancy in the event of subsequent failure by one of the other SPEs during the life of the Cell processor.

The PPU 155 can assign tasks to SPEs in several ways. For example, SPEs may be chained together to handle each step in a complex operation, such as accessing a DVD, video and audio decoding, and error masking, with each step being assigned to a separate SPE. Alternatively or in addition, two or more SPEs may be assigned to operate on input data in parallel, as in the particle animation example above.

Software instructions implemented by the Cell processor 100 and/or the RSX 200 may be supplied at manufacture and stored on the HDD 400, and/or may be supplied on a computer readable data carrier or storage medium such as an optical disk or solid state memory, or via a transmission medium such as a wired or wireless network or internet connection, or via combinations of these.

The software supplied at manufacture comprises system firmware and the Playstation 3 device's operating system (OS). In operation, the OS provides a user interface enabling a user to select from a variety of functions, including playing a game, listening to music, viewing photographs, or viewing a video. The interface takes the form of a so-called cross media-bar (XMB), with categories of function arranged horizontally. The user navigates by moving through the function icons (representing the functions) horizontally using the game controller 751, remote control 752 or other suitable control device so as to highlight a desired function icon, at which point options pertaining to that function appear as a vertically scrollable list of option icons centred on that function icon, which may be navigated in analogous fashion. However, if a game, audio or movie disk 440 is inserted into the BD-ROM optical disk reader 430, the Playstation 3 device may select appropriate options automatically (for example, by commencing the game), or may provide relevant options (for example, to select between playing an audio disk or compressing its content to the HDD 400).

In addition, the OS provides an on-line capability, including a web browser, an interface with an on-line store from which additional game content, demonstration games (demos) and other media may be downloaded, and a friends management capability, providing on-line communication with other Playstation 3 device users nominated by the user of the current device; for example, by text, audio or video depending on the peripheral devices available. The on-line capability also provides for on-line communication, content download and content purchase during play of a suitably configured game, and for updating the to firmware and OS of the Playstation 3 device itself. It will be appreciated that the term "on-line" does not imply the physical presence of wires, as the term can also apply to wireless connections of various types.

Embodiments of the present invention in which a point of interest within augmented reality images can be generated so that a computer generated object can be caused to interact with an image region corresponding to the point of interest will now be described with reference to FIGS. 4 to 6.

Figure 4:
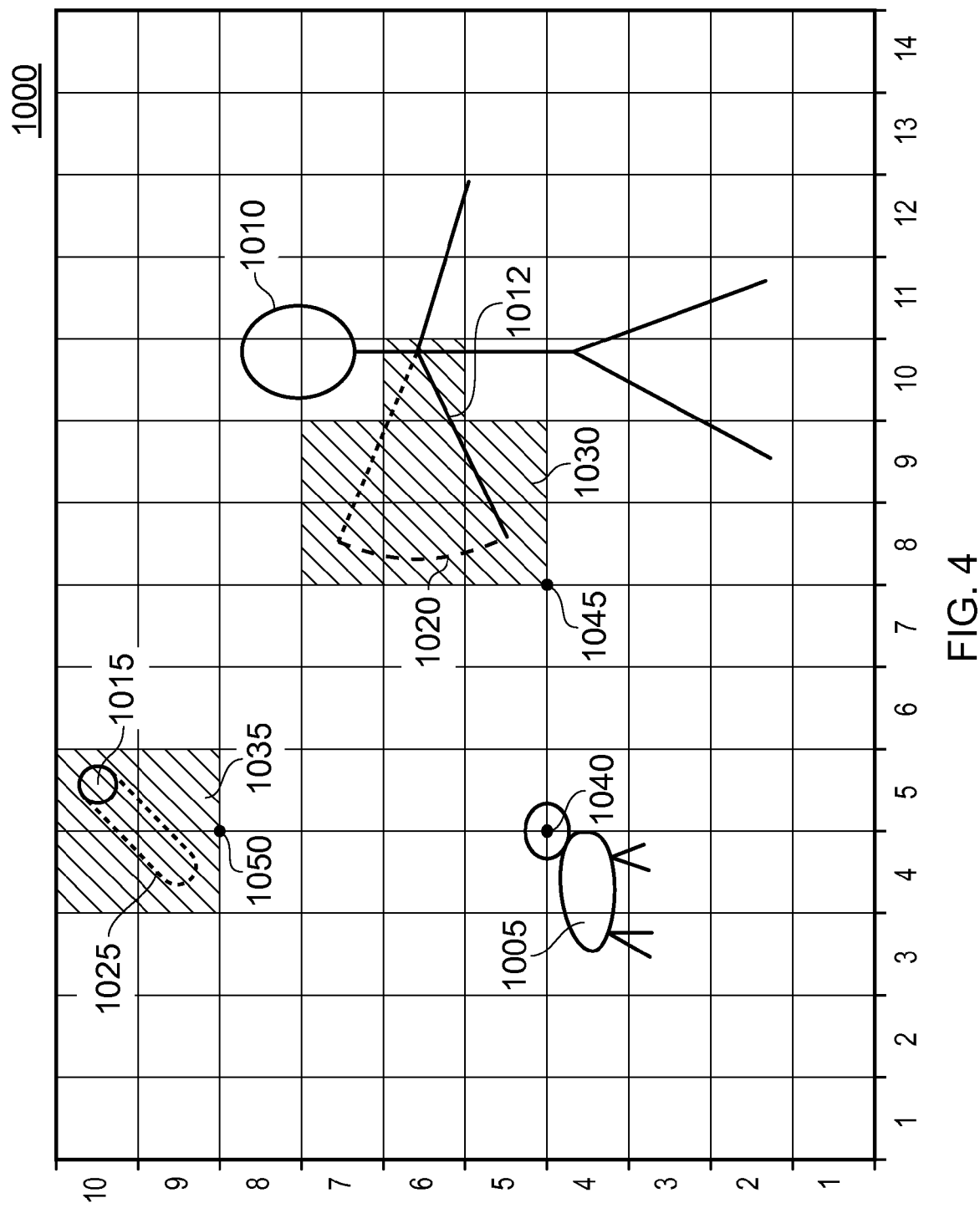
FIG. 4 is a schematic diagram of an augmented reality image in which a computer generated object can be caused to interact with a point of interest in the augmented reality image in accordance with embodiments of the present invention.

FIG. 4 is a schematic diagram of an augmented reality image in which a computer generated object can be caused to interact with a point of interest in the augmented reality image in accordance with embodiments of the present invention. In particular, FIG. 4 shows an augmented reality image 1000. The cell processor 100 is operable to generate the augmented reality image 1000 by combining an image frame of a sequence of image frames received from the camera 756 with a computer generated object, such as a virtual pet 1005.

The virtual pet 1005 may be generated by the cell processor 100 so that, when the virtual pet 1005 is combined with the sequence of image frames received from the camera, augmented reality images are generated. In other words, in embodiments, the augmented reality image 1000 is part of a sequence of augmented reality images.

In some embodiments, the cell processor 100 is operable generate a three-dimensional virtual environment, and generate the virtual pet 1005 within the virtual environment. The cell processor 100 is then operable to combine the received sequence of images frames with images corresponding to the virtual environment so as to generate the sequence of augmented reality images. In other words, in embodiments, the cell processor 100 is operable to generate an augmented reality environment by combining the received sequence of image frames with images corresponding to the virtual environment.

The camera 756 is operable to capture a sequence of image frames of objects in a real world environment. In the example shown in FIG. 4, the real world objects correspond to a user 1010 and a ball 1015. When the sequence of image frames is combined by the cell processor 100 with the virtual pet 1005, it will appear to a user as if part of the augmented reality image 1000.

In embodiments, the cell processor 100 is operable to divide each received image frame into an array of image motion cells. An example of the division of a received image frame into a plurality of image motion cells is illustrated in FIG. 4. In the example shown in FIG. 4, augmented reality image 1000 is shown divided into an rectangular array of 140 to image motions cells (as indicated by the horizontal and vertical dotted lines), corresponding to ten rows and fourteen columns of image motion cells. In embodiments, the position of each image motion cell is described in terms of a horizontal position and a vertical position, although it will be appreciated that any other suitable method for identifying each image motion cell could be used.

For example, referring to FIG. 4, an image cell at (5, 10) corresponds to an image motion cell in which the ball 1015 is located. More generally, the location of an image motion cell is given by (x, y), where x is the horizontal position (column number) and y is the vertical position (row number). In embodiments, the image motion cells are substantially square, although it will be appreciated that any other suitable shape, tessellating or otherwise, could be used.

In some embodiments, the camera 756 has an image resolution of 640 by 480 pixels. Accordingly, in some embodiments each received image frame is divided into an array of 32 columns and 24 rows of image motion cells, with each image motion cell corresponding to 20 by 20 pixels (400 pixels in total for each image motion cell). In these embodiments, there are 768 image motion cells. However, it will be appreciated that the camera 756 may have any other suitable resolution and that any suitable number of image motion cells could be used.

Although in FIG. 4 the augmented reality image 1000 is shown as divided into image motion cells, the skilled person would appreciate that in some embodiments it is the received image frames which are divided into the array of image motion cells. The image motion cells are illustrated in FIG. 4 merely for the purposes of understanding the embodiments. Preferably, the image motion cells are not visible to a user in the augmented reality images. Alternatively, each augmented reality image may be divided into an array of image motion cells.

In embodiments, the cell processor 100 is operable to cause the virtual pet 1005 to appear to interact with objects in the real world such as the user 1010 or the ball 1015. The way in which this functionality is achieved will now be described with reference to FIGS. 4 to 6.

Figure 5:
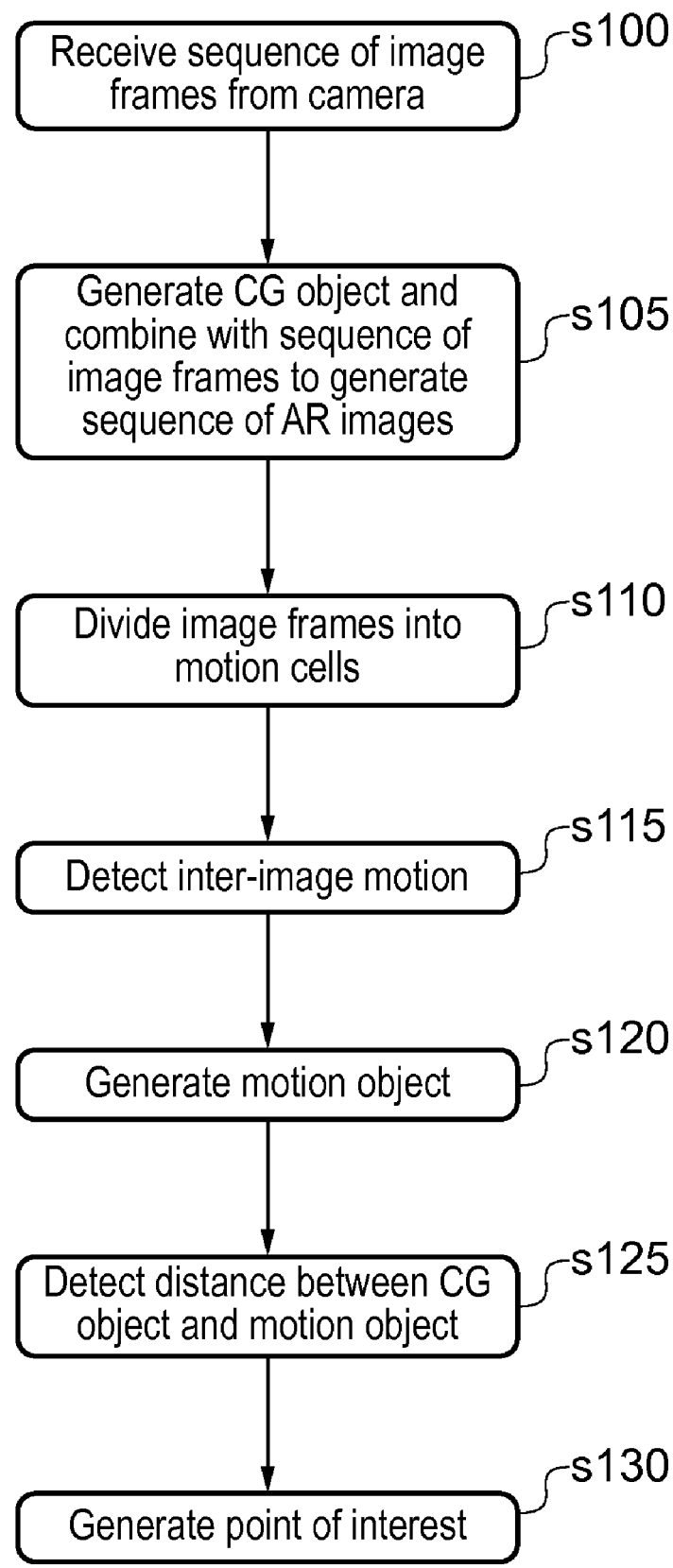
FIG. 5 is a flowchart of a method of image processing in accordance with embodiments of the present invention.

FIG. 5 is a flowchart of a method of image processing in accordance with embodiments of the present invention.

At a step s100, a sequence of image frames are received by the system unit 10 from the camera 756 via a communications link such as the USB port 710, although it will be appreciated that any other suitable wired or wireless communications link could be used such as Bluetooth, WiFi, ethernet, and the like.

Figure 6A:
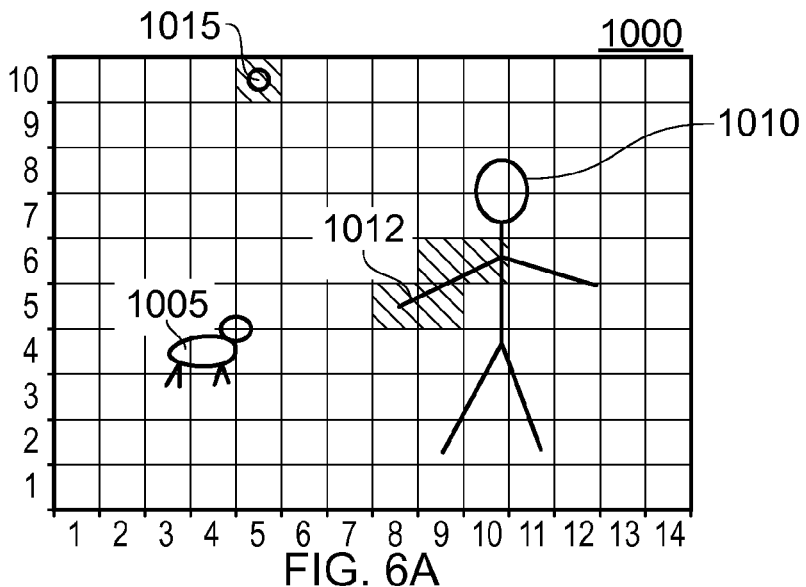
FIGS. 6A to 6C are schematic diagrams of a sequence of augmented reality images in accordance with embodiments of the present invention.
Figure 6B:
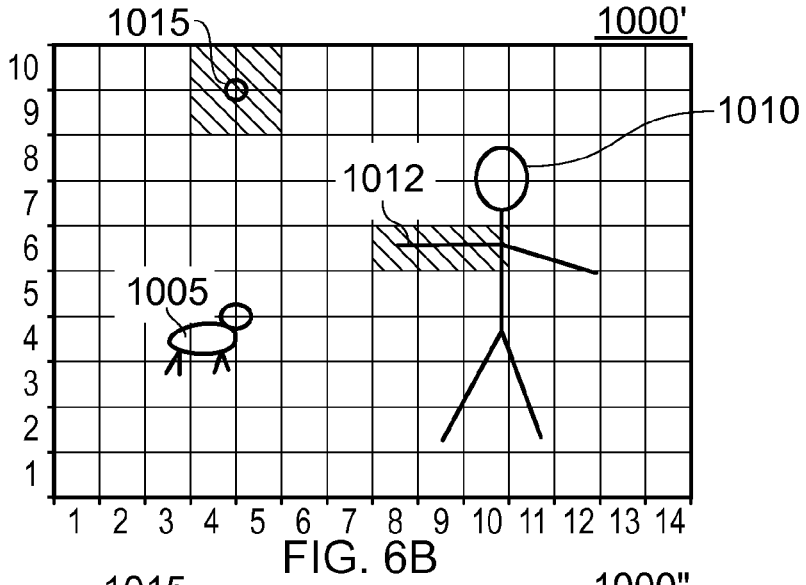
Figure 6C:
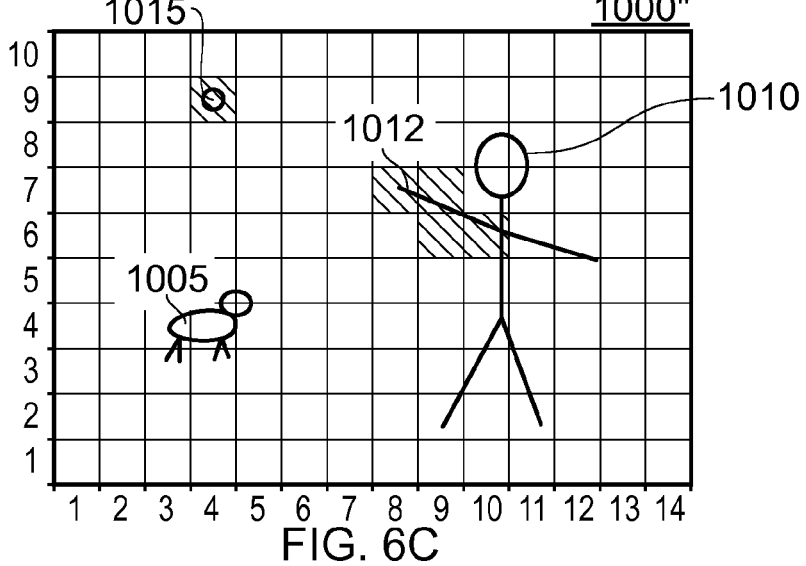

Then, at a step s105, the cell processor 100 generates a computer generated object, such as the virtual pet 1005, and combines the computer generated object with the sequence of image frames so as to generate a sequence of augmented reality images. The sequence of augmented reality images comprises the augmented reality image 1000 illustrated in FIG. 4. A sequence of augmented reality images is also shown in FIGS. 6A, 6B and 6C, which are schematic diagrams of a sequence of augmented reality images in accordance with embodiments of the present invention. These will be described in more detail later below.

At a step s110, the cell processor 100 divides each received image frame into a respective array of image motion cells. In embodiments, each received image frame is divided into the array by assigning a predetermined number of pixels of the received image frame in the horizontal and vertical directions to an image position corresponding to the image motion cell. However, it will be appreciated that any other suitable technique could be used to divide the received image frames into respective arrays of image motion cells. In embodiments, the predetermined number of pixels is 400, corresponding to 20 pixels in the horizontal direction and 20 pixels in the vertical direction, although any other numbers of pixels could be used.

Then, at a step s115, the cell processor detects inter-image motion in successive image frames for each motion cell.

In some embodiments, the detection of inter-image motion for each motion cell is based on the detection of inter-image motion with respect to each pixel of that image motion cell. Therefore, in embodiments, the cell processor 100 is operable to detect a degree of inter-image motion in respect of each pixel of a current image frame. To achieve this, the cell processor 100 is operable to calculate, for each pixel, a difference in pixel value of a pixel in the current image frame and a corresponding pixel in a preceding image frame. Those pixels whose pixel values for a current frame are different from the pixel values of the respective pixels in the preceding image frame are designated as comprising inter-image motion. However, it will be appreciated that any other suitable method for detecting inter-image motion may be used. In some embodiments, so as to reduce the effects of lighting differences, pixel noise, and the like leading to false detection of motion, image pre-processing operations such as blur reduction, noise filtering and the like may be carried out by the cell processor 100 on the image frames before the cell processor 100 carries out detection of inter-image motion.

So as to detect inter-image motion in successive image frames for each motion cell, in some embodiments, the cell processor is operable to increase the degree of inter-image motion associated with a pixel for which inter-image motion is detected if the degree of inter-image motion detected for that pixel is greater than an image motion threshold. The cell processor then generates a pixel motion flag associated with that pixel. Image motion cells which have at least one associated pixel motion flag are designated by the cell processor 100 as comprising inter-image motion. In other words, the cell processor is operable to amplify the detected degree of motion for a pixel if the detected degree of inter-image motion is greater than the image motion threshold. Those image motion cells whose respective pixels have had their detected degree of image motion amplified therefore correspond to image regions comprising inter-image motion.

In some embodiments, the cell processor 100 is operable to generate a motion cell weight associated with each image motion cell. In some embodiments, the motion cell weight is indicative of the detected degree of motion of pixels associated with the respective image motion cell. In some embodiments, the motion cell weight for each image motion cell can be a value from 0.0 to 1.0, although any other suitable values could be used. In some embodiments, the cell processor 100 is operable to set the motion cell weight to 1.0 if there is at least one pixel associated with the image motion cell which is detected as comprising inter-image motion, although it will be appreciated that the motion cell weight could be set to any other appropriate value.

In other embodiments, the motion cell weight is dependent upon the number of pixels associated with that image motion cell which are detected as comprising inter-image motion.

In other embodiments, the cell processor 100 carries out detection of inter-image motion based on the average pixel difference of pixels in an image motion cell of a current image frame with the corresponding image motion cell in the preceding image frame.

In some embodiments, the cell processor 100 is operable to decrement a motion cell weight by a motion cell weight decrement amount if, for a current frame, no inter-image motion is detected in respect of the pixels associated with that image motion cell. The motion cell weight may be decremented every frame (every 1/25 second for an example frame rate of 25 frames per second) although it could be decremented at any other suitable time, such as every second. Preferably, the decrement amount is such that the motion cell weight decreases to 0.0 over 3 to 4 seconds if no inter-image motion is detected in respect of that image motion cell, although it could decrease to 0.0 over any other suitable time period.

However, if any subsequent inter-image motion in respect of any of the pixels associated with a motion cell is detected after the motion cell weight has been decremented for that image motion cell, then the cell processor 100 is operable to increase the motion cell weight to 1.0. However, the motion cell weight could be increased to any other suitable value. In some embodiments, each image motion cell has a respective motion cell decrement amount. In some embodiments, the motion cell decrement amount for each image motion cell is the same, although in other embodiments, some or all of the motion cell decrements may be the same or different from each other.

The motion cell weight can be used when generating a point of interest as will be described in more detail below.

It will be appreciated that a captured object near the edge of the captured image may be more likely to leave the field of view of the camera than object nearer the centre of the captured image. Therefore, in some embodiments, the motion cell decrement amount for image motion cells closer to the edge of the image is greater than the motion cell decrement amount for image motion cells closer to the centre of the image.

More generally, the motion cell decrement amount associated with image motion cells corresponding to a first image region is greater than a motion cell decrement amount associated with image motion cells corresponding to a second image region. Preferably, a first motion cell decrement amount associated with the first image region is greater than a second motion cell decrement amount associated with the second image region.

For example, image motion cells nearer the edge of the image can have a greater motion cell decrement amount than motion cells nearer the centre of the image and therefore the motion cell weight for motion cells nearer the edge will decrease to 0.0 more quickly than motion object cells closer to the centre of the image. Therefore, image motion cells nearer the centre of the image are more likely to persist and contribute to a motion object from which a point of interest may be generated as described below.

At a step s120, the cell processor generates a motion object comprising one or more image motion cells detected as comprising inter-image motion over a threshold number of image frames (e.g. 4 image frames). In some embodiments, the cell processor 100 is operable to store history buffer data to the XDRAM 500 which is indicative of which image motion cells in which image frames comprise inter-image motion. It will be appreciated that the history buffer data could be stored in any other suitable memory element such as the hard disc drive HDD 400. In embodiments, the cell processor 100 uses the history motion buffer to generate a motion object based on which image motion cells are detected as comprising inter-image motion over a threshold number of image frames. Preferably, the threshold number of image frames is four, although any other suitable threshold number of image frames could be used.

A way in which a motion object may be generated in accordance with embodiments will be described in more detail below with reference to FIGS. 6A to 6C.

Referring to FIG. 4, the user 1010 is shown waving their arm 1012, where the dashed line indicates an extent of motion over several image frames preceding the image frame used to generate the augmented reality image 1000. Additionally, in the example shown in FIG. 4, the ball 1015 has an extent of motion over a plurality of preceding image frames as indicated by the dashed line 1025. Therefore, the cell processor 100 is operable to generate a motion object corresponding to the diagonally shaded area as the image motion cells (8, 5), (9, 5), (8, 6), (9, 6), (10, 6), (8, 7), and (9, 7) comprise inter-image motion over the threshold number of image frames. Additionally, the cell processor is operable to generate a motion object corresponding to the diagonally shaded area 1035 as the image motion cells (4, 9), (5, 9), (4, 10), and (5, 10) comprise inter-image motion over the threshold number of image frames.

The generation of motion objects in accordance with embodiments of the present invention will now be described in more detail with reference to FIGS. 6A to 6C.

In the examples described below with reference to FIGS. 6A to 6C, the threshold number of image frames is three, although it will be appreciated that, as mentioned above, any other threshold number of image frames could be used.

FIG. 6A shows a schematic diagram of the current image frame n combined with the virtual pet 1005 so as to generate the augmented reality image 1000.

FIG. 6B shows a schematic diagram of a preceding image frame n−1 combined with the virtual pet 1005 so as to generate an augmented reality image 1000'. The image frame n−1 is an image frame immediately preceding the current image frame n.

FIG. 6C shows a schematic diagram of a preceding image frame n−2 combined with the virtual pet 1005 so as to generate an augmented reality image 1000". The image frame n−2 is an image frame which precedes the current image frame n by two image frames.

In FIG. 6A, the user is illustrated with their arm 1012 in a downward orientation, and therefore the image motion cells (8, 5), (9, 5), (9, 6), and (10, 6) will be detected by the cell processor as comprising inter-image motion with respect to the image frame n−1, in which the user's arm 1012 is in a substantially horizontal orientation. Similarly, the image motion cell (5, 10) will be detected as comprising inter-image motion because the position of the ball 1015 in the current image frame n is different from the position of the ball in the image frame n−1.

Referring to FIG. 6B, the user is illustrated with their arm 1012 in a substantially horizontal position, and therefore the cell processor 100 will detect inter-image motion as to corresponding to image motion cells (8, 6), (9, 6), and (10, 6) with respect to the image frame n−2, in which the user's arm 1012 is in a raised position. Similarly, image motions cells (4, 9), (5, 9), (4, 10), and (5, 10) will be detected as comprising inter-image motion with respect to the image frame n−2 because the position of the ball 1015 in the image frame n−1 is different from that in the image frame n−2.

Referring to FIG. 6C, the user 1010 is illustrated with their arm 1012 in a downward position. In this example, in an image frame n−3 (not shown) immediately preceding the image frame n−2, the user's arm 1012 was by their side, and the ball 1015 was at a position in image motion cell (3, 8). Therefore, the cell processor will detect inter-image motion at image motion cells (9, 6), (10, 6), (8, 7), and (9, 7), and inter-image motion at image motion cell (4, 9).

In embodiments, the cell processor 100 is operable to generate motion objects based on the history buffer data. As can be seen from FIGS. 6A to 6C, the image motion cells (8, 5), (9, 5), (8, 6), (9, 6), (10, 6), (8, 7), and (9, 7) comprise inter-image motion over three image frames (including the current image frame) and therefore, the cell processor 100 is operable to generate the motion object corresponding to the shaded area 1030 shown in FIG. 4 as corresponding to the image motion cells (8, 5), (9, 5), (8, 6), (9, 6), (10, 6), (8, 7), and (9, 7). Similarly, image motion cells (4, 9), (5, 9), (4, 10), and (5, 10) comprise inter-image motion over three image frames (including the current image frame) and therefore the cell processor 100 is operable to generate the motion object corresponding to the shaded area 1035 in FIG. 4.

In embodiments, the detection of whether inter-image motion occurs over the threshold number of image frames is carried out over consecutive image frames. However, in other embodiments, the image frames for the threshold number of images need not be consecutive. For example, inter-image motion could be detected in respect of every other image frame and therefore a threshold of image frames corresponding to three frames would actually correspond to six consecutive image frames. Additionally, it will be appreciated that the threshold number of image frames could be one image frame, in which case only inter-image motion between the current frame and the preceding frame will be taken into account when generating the motion object.

However, the use of an threshold number of images greater than one tends to lead to the generation of more stable motion objects which are less likely to fluctuate in size or position over the sequence of image frames. Furthermore, this facilitates tracking of the point of interest through the sequence of augmented reality images because there is likely to be less variation in position of the point of interest on a frame by frame basis. Tracking of the point of interest and potential points of interest will be described in more detail later below.

Referring back to FIG. 5, at a step s125, the cell processor is operable to detect a relative distance between the virtual pet 1005 and each of the motion objects. For example, referring to FIG. 4, the cell processor is operable to detect a distance between the virtual pet at a point 1040 and the motion object at shaded area 1030 and the motion object at the shaded area 1035. To achieve this, the cell processor is operable to draw a line from the point 1040 to every point on a perimeter of each motion object. The shortest line between the point 1040 and a motion object is used to determine potential point of interest for that motion object. Referring to the example shown in FIG. 4, a point 1045 on the motion object corresponding to shaded area 1030 is closer to the point 1040 than a point 1050 on the motion object corresponding to the shaded area 1035. However, both the point 1045 and the point 1050 are potential points of interest. It will be appreciated that any other suitable method of detecting the relative distance between the virtual pet 1005 and each of the motion objects could be used.

Therefore, the cell processor 100 is operable to generate the point of interest as corresponding to the point 1045 so that the virtual pet can be caused to appear to interact with an image region corresponding to the image motion cell (8, 5). For example, the cell processor 100 could cause the virtual pet 1005 to jump towards the point of interest at the point 1045. In other words, the cell processor 100 is operable to select a point of interest from one or more potential points of interest in dependence upon the detected distance between the computer generated image at each motion object.

Then, at a step s130, the cell processor generates a point of interest within the current image frame. In some embodiments, the point of interest is an image motion cell of the motion object which corresponds to the closest distance between the computer generated object and the motion object within the augmented reality images. The cell processor 100 can then cause the computer generated object to appear to interact with an image region corresponding to an image motion cell at the point of interest.

More generally, the cell processor is operable to detect a relative distance between the computer generated object and the motion object within the augmented reality images, and to generate a point of interest within a current image frame in dependence upon the detected distance between the computer generated object and the motion object so that the computer generated object can be caused to appear to interact with an image region corresponding to an image motion cell at the point of interest.

By generating a motion object from image motion cells, a point of interest can be generated within the current image frame in dependence upon a detected distance between the computer generated (CG) object and the motion object. For example, a virtual object such as the virtual pet 1005 can then be caused to interact with an image region corresponding to an image motion cell at the point of interest. This advantageously allows the point of interest to be generated such that it is likely to correspond to an image position at which the user wishes to interact with the virtual object. This can provide a more realistic augmented reality experience for a user.

Additionally, by detecting motion in respect of image motion cells, processing resources needed to generate a point of interest can be reduced due to the relatively coarse array of image motion cells. This is in contrast to a situation in which a point of interest is to be generated by analysing each pixel detected as comprising inter-image motion. For example, a camera resolution of 640 by 480 pixels provides 307,200 pixels, each of which may have to be analysed to find the closest point to the computer generated object. In contrast, an array of 32 by 24 image motion cells gives 768 image motion cells, a factor of 400 smaller than the number of pixels provided by the camera 756 in some of the embodiments described above.

In some embodiments, the cell processor 100 is operable to track a position of the point of interest through the sequence of image frames using known techniques such as Kalman filtering so as to generate point of interest tracking data. Additionally, in some embodiments, the cell processor 100 is operable to generate tracking data in respect of each potential point of interest. In the example shown in FIG. 4, the cell processor 100 is operable to track both the point 1045 and the point 1050. In some embodiments, the cell processor 100 is operable to predict a position of the point of interest and/or each potential point of interest for a next image frame in the sequence of image frames based on the tracking data using known techniques. In some embodiments the cell processor 100 is operable to track any or all of: one or more image motion cells; the point of interest; and the potential point of interest using known techniques. For each potential point of interest, the cell processor is operable to generate tracking data as shown in the table below, although it will be appreciated that other tracking data may have a similar format. Additionally, it will be appreciated that the tracking data may have any appropriate format.

| FwVector4 | m_worldPosition; | world position after projection on any virtual plane |
|---|---|---|
| FwVector4 | m_bottomPosition; | estimated bottom world position after projection on virtual plane |
| FwVector4 | m_petZLinePosition | world position after projection on the Z plane of the pet |
| FwVector4 | m_floorPosition | world position on the floor plane |
| FwVector4 | m_direction | the direction of the tracker |
| f32 | m_lifeTime | remaining life time until tracker disappears (set to max lifetime every time when movement is detected |
| f32 | m_activeTime | time since the tracker has been activated |

-continued

| | | |
|---|---|---|
| f32 | m_recentWeightLifeTime | time since the last movement of this tracker |
| f32 | m_lastVelocity | the last velocity of the tracker |
| f32 | m_maximumWeight | the maximum weight (=rough size of connected motion area) encountered during its life |
| f32 | m_currentWeight | the current weight (updated every 8 frames) |
| f32 | m_originalScreenX | The original screen x position of the tracker |
| f32 | m_originalScreenY | The original screen y position of the tracker |
| EPOIClass | m_poiClass | whether this tracker started in the play area and stayed there, or if this tracker is a face tracker |
| bool | m_onScreen | set if the point is visible on the screen |
| u8 | m_participant | the participant (=object in the virtual world) that this tracker belongs to |
| int | m_uniqueId | unique id that identifies this tracker |
| bool | m_faceSmiling | set if the face is smiling (if this is a face tracker) |

In some embodiments, the cell processor 100 is operable to track faces through the to sequence of images and to detect whether a face is smiling using known techniques such as face recognition, smile detection and the like.

It will be appreciated that the image motion cells have a relatively coarse resolution in comparison to the number of pixels. Whilst this speeds up image processing, when tracking image motion cells, and or image motion object, this can lead to tracking artefacts or give the appearance that the motion is not tracked smoothly, leading to a jerky appearance when the pet is cause to interact with a point of interest. Therefore, in some embodiments, the cell processor 100 is operable to interpolate between the image motion cells so as to generate a smoother track. In other words, in some embodiments, the cell processor is operable to generate the tracking data by interpolating between the image motion cells.

It will be appreciated that real world objects are unlikely to disappear suddenly from the field of view, especially if they are towards the centre of the field of view of the camera. However, if a real world object stops moving, the cell processor 100 is unlikely to detect any inter-image motion associated with that object and therefore may cause the virtual pet 1005 to to ignore that real world object. For example, a user may wave their hand, briefly stop waving (a pause), and then wave their hand again. However, during the pause, the cell processor is unlikely to be able to detect any motion and therefore may ignore the user's hand and cause the virtual pet 1005 to interact with another point of interest further away from the user's hand. This can impair an illusion to the user that the virtual pet 1005 is actually in the real world environment.

To address this, the cell processor is operable to detect whether any of the image motion cells associated with the motion object generated in respect of a preceding image frame in the sequence of image frames comprise inter-image motion with respect to the current image frame in the sequence of image frames. The cell processor is operable to generate the motion object in respect of the preceding image plane so that it has an associated preceding point of interest located at a first position within the preceding image frame. If none of the image motion cells associated with the motion object is detected as comprising inter-image motion in respect of the current image frame, then the cell processor is operable to generate a current point of interest for the current image frame so that the current point of interest is located at a second position within the current image frame corresponding to the first position within the preceding image frame. In other words, the cell processor generates the point of interest for the current image frame so that it is located at the same position as the point of interest in the preceding image frame.

In some embodiments, if no subsequent motion is detected at the point of interest the cell processor is operable to generate the point of interest so that it is located at the second position for a predetermined number of image frames. Preferably, the predetermined number of image frames is such that the point of interest is located at the second position for three to four seconds, although it will be appreciated that any suitable predetermined number of image frames could be used. The predetermined number of image frames is typically set within software implementing the augmented reality environment although it will be appreciated that this could be set by the user via the cross media bar or in other suitable manner.

It will be appreciated that some image regions in which inter-image motion is detected may relate to movement intended to interact with the virtual pet, whilst other regions may correspond to unintentional movement within the image frames. Furthermore, where there is more than one image region comprising inter-image motion, it may be difficult to distinguish them from each other. For example, although the shaded area 1030 in FIG. 4 is shown as being a separate motion object from the shaded area 1035, the two regions may be merged to form one motion object, for example if they were closer together.

Therefore, in order to distinguish between image regions comprising inter-image motion and generate motion objects appropriately, the cell processor 100 is operable to detect one or more groups of image motion cells which are adjacent to each other and which comprise inter-image motion over the threshold number of image frames. Each detected group of adjacent image motion cells correspond to a respective motion object. Referring to FIG. 4, the image motion cells associated with the ball 1015 are not adjacent to the image motion cells associated with the user 1010 and therefore a separate motion object will be generated for each group of image motion cells.

In embodiments, the cell processor is operable to detect, for each group of image motion cells corresponding to a motion object, a relative closest distance between the computer generated object and the respective motion object. As mentioned above, the cell processor 100 is operable to detect the closest distance by finding the shortest line between the virtual pet 1005 and a point on the perimeter of the respective motion object. The cell processor 100 is then operable to generate a motion object weight which is associated with that motion object. In some embodiments, each motion object weight is associated with the relative distance between the computer generated object and the respective motion object.

In some embodiments, the cell processor 100 is operable to generate each motion object weight such that a greater object weight is associated with a smaller distance between the computer generated object and the motion object, and a lesser object weight is associated with a greater distance between the computer generated object and the motion object. The cell processor 100 is operable to detect which of the motion objects has the greatest motion object weight, and generate the point of interest so that it corresponds to an image motion cell of an image motion object detected as having the greatest motion object weight.

In other words, as mentioned above, in some embodiments the cell processor is operable to generate the point of interest so that it corresponds to the shortest distance between the computer generated object and an image motion cell of an image motion object. This advantageously allows different motion objects to be distinguished from each other, with the point of interest being generated accordingly. In some embodiments each motion object weight is indicative of a number of image motion cells in the respective motion object. In other embodiments, the motion object weight is indicative of the number of image motion cells in the respective motion object and/or the relative distance between the computer generated object and the respective motion object. More generally, the cell processor 100 is operable to select a point of interest from the potential points of interest in dependence upon the motion object weight associated with a motion object.

In some embodiments, each motion object weight comprises the respective motion cell weights associated with the image motion cells of that object. In other words, the motion object weight can be associated with motion cell weights of the image motion object and the point of interest generated accordingly in dependence on each motion object weight associated with each motion object. For example, the motion cell weights of each motion object could be summed together to generate the motion object weight, with the motion object having the greatest object weight being selected for generation of the point of interest.

As mentioned above, a real world object may not have any inter-image motion associated with it even though a user may desire that the virtual pet still be caused to interact with that real world object. Therefore, in embodiments, the cell processor 100 is operable to generate the point of interest in dependence upon each respective object weight. In other words, the cell processor 100 is operable to generate the point of interest so that it corresponds to an image motion cell of a motion object having the greatest object weight. However, if the real world object is stationary, it may still be desirable to associate a motion object weight with the motion object previously associated with the real world object.

Therefore, in some embodiments, the cell processor 100 is operable to detect whether any of the image motion cells associated with motion objects generated in respect of a preceding image frame in the sequence of image frames comprise inter-image motion with respect to the current image frame in the sequence of image frames. For each motion object of the preceding image frame that is detected as not comprising any inter-image motion with respect to the current image frame, the cell processor is operable to decrease the motion object weight associated with that motion object. In some embodiments, the cell processor 100 is operable to decrease the motion object weight associated with a motion object by a decrement amount for each subsequent image frame for which no inter-image motion is detected in respect of that motion object. Preferably, the decrement amount is such that the motion object weight decays to zero over a time period of three to four seconds, although it will be appreciated that any suitable decrement amount may be used.

If inter-motion is subsequently detected in pixels associated with s motion object, the motion object weight for that motion object can increased by an increment, or set to a maximum object weight value as appropriate. However, it will be appreciated that any other suitable value could be used.

As mentioned above, the virtual pet 1005 may be generated within a three dimensional virtual environment. However, the images captured by the camera are typically two dimensional. Therefore, to provide an illusion of depth so that the virtual pet 1005 can be caused to appear to move toward and to move away from a user viewing the display 300, in some embodiments, the cell processor 100 is operable to generate the virtual environment so that the virtual environment comprises a vertical virtual plane associated with a virtual depth at which the point of interest occurs within the virtual environment with respect to a reference point in the virtual environment. The cell processor 100 is then operable to generate the vertical virtual plane so that it is associated with the point of interest and so that the vertical virtual plane moves in dependence on the number of image motion cells in the motion object associated with the point of interest.

For example, if the motion object associated with the point of interest comprises a larger number of image motion cells, the cell processor 100 can cause the vertical virtual plane to be closer to the user and therefore the point of interest will appear closer to the user. As another example, if the motion object associated with the point of interest comprises a smaller number of image motion cells, the cell processor 100 can cause the vertical virtual image plane to be further away from the user in the augmented reality environment, and therefore the point of interest will appear further away from the user. When the cell processor 100 causes the pet 1005 to interact with the point of interest, the cell processor 100 can cause the virtual pet 1005 to appear to run towards or away from the user depending on the position of the vertical virtual plane and hence the apparent depth of the point of interest in the augmented reality environment. This improves an illusion to the user that the virtual pet 1005 is within the real world as represented by the augmented reality environment.

Although one computer generated object has been described in the embodiments mentioned above, it will be appreciated that more than one computer generated object could be generated and a point of interest generated as described above could be generated for each computer generated object. Alternatively all the computer generated objects could have the same point of interest, with the point of interest being generated with respect to one of the computer generated objects, for example in response to a selection of that computer generated object by the user.

It will be appreciated that the motion object weight could be associated with any or all of: the motion cell weights associated with that motion object; distance data representing the relative distance between the computer generated object and the respective motion object; and the number of image motion cells in that motion object.

It will be appreciated that although the camera described above is operable to capture two-dimensional images (a 2D camera), other cameras could be used. In some embodiments, a so-called three-dimensional (3D) camera may be used to capture the sequence of images. The 3D camera is operable to generate depth information for each pixel indicative of the relative distance between the camera and objects within the captured image. Such cameras are sometimes called "z-cameras" because of their ability to capture depth data (for example, in a z-direction).

In embodiments, the depth data can then be used to generate inter-image motion data used to detect inter-image motion. The use of a 3D camera improves the quality of the motion data therefore improving detection of inter-image motion and tracking of objects. It will be appreciated that more than one camera could be used, and that data from one or more 2D cameras and/or one or more 3D cameras could be combined. Furthermore, any other suitable type of 2D or 3D camera may be used.

An image processing system according to embodiments of the invention comprises an image processing device as defined above and a camera operable to capture a sequence of image frames, and to transmit the sequence of image frames to the image processing apparatus.

Finally, it will be appreciated that the methods disclosed herein may be carried out on conventional hardware suitably adapted as applicable by software instruction or by the inclusion or substitution of dedicated hardware.

Thus the required adaptation to existing parts of a conventional equivalent device may be implemented in the form of a computer program product comprising processor implementable instructions stored on a computer readable medium or data carrier such as a floppy disk, optical disk, hard disk, PROM, RAM, flash memory or any combination of these or other storage media, or transmitted via data signals on a network such as an Ethernet, a wireless network, the Internet, or any combination of these of other networks, or realised in hardware as an ASIC (application specific integrated circuit) or an FPGA (field programmable gate array) or other configurable circuit suitable to use in adapting the conventional equivalent device.

In conclusion, although a variety of embodiments have been described herein, these are provided by way of example only, and many variations and modifications on such embodiments will be apparent to the skilled person and fall within the scope of the present invention, which is defined by the appended claims and their equivalents.

The invention claimed is:

1. An image processing method comprising:
    receiving a sequence of image frames from a video camera;
        generating a computer generated object, and combining the computer generated object with the sequence of image frames so as to generate a sequence of augmented reality images;
        dividing each received image frame into a respective array of image motion cells;
        detecting inter-image motion in successive image frames for each motion cell;
        generating a motion object comprising one or more image motion cells, the image motion cells in the motion object corresponding to a set of image motion cells detected as comprising inter-image motion over a threshold number of image frames;
        detecting a relative distance between the computer generated object and the motion object within the augmented reality images; and
        generating a point of interest within a current image frame in dependence upon the detected distance between the computer generated object and the motion object so that the computer generated object can be caused to appear to interact with an image region corresponding to an image motion cell at the point of interest.

2. A method according to claim 1, in which the point of interest is an image motion cell of the motion object which corresponds to a closest distance between the computer generated object and the image motion object within the augmented reality images.

3. A method according to claim 1, comprising tracking a position of the point of interest through the sequence of image frames so as to generate point of interest tracking data.

4. A method according to claim 3, comprising predicting a position of the point of interest for a next image frame in the sequence of image frames based on the point of interest tracking data.

5. A method according to claim 1, comprising:
    detecting whether any of the image motion cells associated with the motion object generated in respect of a preceding image frame in the sequence of image frames comprise inter-image motion with respect to the current image frame in the sequence of image frames, the motion object in respect of the preceding image plane having an associated preceding point of interest located at a first position within the preceding image frame;
    and generating a current point of interest for the current image frame so that the current point of interest is located at a second position within the current image frame corresponding to the first position within the preceding image frame if none of the image motion cells associated with the motion object is detected as comprising inter-image motion in respect of the current image frame.

6. A method according to claim 5, in which the point of interest is located at the second position for a predetermined number of image frames.

7. A method according to claim 1, comprising:
    detecting one or more groups of image motion cells which are adjacent to each other and comprise inter-image motion over the threshold number of image frames, each detected group of image motion cells corresponding to a respective motion object;
    detecting, for each group of image motion cells corresponding to a motion object, a relative closest distance between the computer generated object and the respective motion object so as to generate a motion object weight associated with that motion object, in which each motion object weight is associated with the relative distance between the computer generated object and the respective motion object.

8. A method according to claim 7, in which each motion object weight is indicative of a number of image motion cells in the respective motion object.

9. A method according to claim 7, in which a greater object weight is associated with a smaller distance between the computer generated object and the motion object, and a lesser object weight is associated with a greater distance between the computer generated object and the motion object, and the method comprises detecting which of the motion objects has the greatest motion object weight, and in which the point of interest corresponds to an image motion cell of an image motion object detected as having the greatest motion object weight.

10. A method according to claim 7, comprising:
    detecting whether any of the image motion cells associated with motion objects generated in respect of a preceding image frame in the sequence of image frames comprise inter-image motion with respect to the current image frame in the sequence of image frames; and
    for each motion object of the preceding image frame that is detected as not comprising any inter-image motion with respect to the current image frame, decreasing the motion object weight associated with that motion object.

11. A method according to claim 10, comprising decreasing the motion object weight associated with a motion object by a decrement amount for each subsequent image frame for which no inter-image motion is detected in respect of that motion object.

12. A method according to claim 1, comprising:
    detecting a degree of inter-image motion in respect of each pixel of the current image frame;
    increasing the degree of inter-image motion associated with a pixel for which inter-image motion is detected if the degree of inter-image motion detected for that pixel is greater than an image motion threshold so as to generate a pixel motion flag associated with that pixel, in which:
    each motion cell comprises one or more pixels of the respective image frame; and a motion object corresponds to those image motion cells whose respective pixels have at least one associated pixel motion flag.

13. A method according to claim 1, in which:
the augmented reality images relate to a virtual environment comprising a vertical virtual plane associated with a virtual depth at which the point of interest occurs within the virtual environment with respect to a reference point in the virtual environment; and
the vertical virtual plane is associated with the point of interest so that the vertical virtual plane moves in dependence on the number of image motion cells in the motion object associated with the point of interest.

14. A method according to claim 1, in which the threshold number of image frames is four.

15. A tangible, non-transitory computer readable storage medium on which is stored instructions of a computer program, the instructions, when executed by a processor of a computer, cause the computer to perform an image processing method comprising:
receiving a sequence of image frames from a video camera;
generating a computer generated object, and
combining the computer generated object with the sequence of image frames so as to generate a sequence of augmented reality images;
dividing each received image frame into a respective array of image motion cells;
detecting inter-image motion in successive image frames for each motion cell; generating a motion object comprising one or more image motion cells, the image motion cells in the motion object corresponding to a set of image motion cells detected as comprising inter-image motion over a threshold number of image frames;
detecting a relative distance between the computer generated object and the motion object within the augmented reality images; and
generating a point of interest within a current image frame in dependence upon the detected distance between the computer generated object and the motion object so that the computer generated object can be caused to appear to interact with an image region corresponding to an image motion cell at the point of interest.

16. An image processing device comprising:
an image receiver to receive a sequence of image frames from a video camera;
an image generator to generate a computer generated object, and to combine the computer generated object with the sequence of image frames so as to generate a sequence of augmented reality images;
an image divider to divide each received image frame into a respective array of image motion cells;
a motion detector to detect inter-image motion in successive image frames for each motion cell;
an image processor to generate a motion object comprising one or more image motion cells, the image motion cells in the motion object corresponding to a set of image motion cells detected as comprising inter-image motion over a threshold number of image frames;
a distance detector to detect a relative distance between the computer generated object and the motion object within the augmented reality images, in which the image processor is operable to generate a point of interest within a current image frame in dependence upon the detected distance between the computer generated object and the motion object so that the computer generated object can be caused to appear to interact with an image region corresponding to an image motion cell at the point of interest.

17. An image processing system, comprising:
an image processing device; and a video camera to capture a sequence of image frames, and to transmit the sequence of image frames to the image processing device, the image processing device comprising:
an image receiver to receive a sequence of image frames from the video camera;
an image generator to generate a computer generated object, and to combine the computer generated object with the sequence of image frames so as to generate a sequence of augmented reality images; an image divider to divide each received image frame into a respective array of image motion cells;
a motion detector to detect inter-image motion in successive image frames for each motion cell;
an image processor to generate a motion object comprising one or more image motion cells, the image motion cells in the motion object corresponding to a set of image motion cells detected as comprising inter-image motion over a threshold number of image frames; and
a distance detector to detect a relative distance between the computer generated object and the motion object within the augmented reality images, wherein the image processor is operable to generate a point of interest within a current image frame in dependence upon the detected distance between the computer generated object and the motion object so that the computer generated object can be caused to appear to interact with an image region corresponding to an image motion cell at the point of interest.

18. An image processing device comprising:
receiving means operable to receive a sequence of image frames from a video camera;
image generating means operable to generate a computer generated object, and to combine the computer generated object with the sequence of image frames so as to generate a sequence of augmented reality images;
image dividing means operable to divide each received image frame into a respective array of image motion cells;
motion detecting means operable to detect inter-image motion in successive image frames for each motion cell;
image processing means operable to generate a motion object comprising one or more image motion cells, the image motion cells in the motion object corresponding to a set of image motion cells detected as comprising inter-image motion over a threshold number of image frames;
distance detecting means operable to detect a relative distance between the computer generated object and the motion object within the augmented reality images, in which the image processing means is operable to generate a point of interest within a current image frame in dependence upon the detected distance between the computer generated object and the motion object so that the computer generated object can be caused to appear to interact with an image region corresponding to an image motion cell at the point of interest.

19. An image processing system comprising:
an image processing device; and
a video camera operable to capture a sequence of image frames, and to transmit the sequence of image frames to the image processing device, the image processing device comprising:

receiving means operable to receive a sequence of image frames from the video camera;

image generating means operable to generate a computer generated object, and to combine the computer generated object with the sequence of image frames so as to generate a sequence of augmented reality images;

image dividing means operable to divide each received image frame into a respective array of image motion cells; motion detecting means operable to detect inter-image motion in successive image frames for each motion cell;

image processing means operable to generate a motion object comprising one or more image motion cells, the image motion cells in the motion object corresponding to a set of image motion cells detected as comprising inter-image motion over a threshold number of image frames;

distance detecting means operable to detect a relative distance between the computer generated object and the motion object within the augmented reality images, and wherein the image processing means is operable to generate a point of interest within a current image frame in dependence upon the detected distance between the computer generated object and the motion object so that the computer generated object can be caused to appear to interact with an image region corresponding to an image motion cell at the point of interest.

* * * * *